July 29, 1969   M. L. J. MARTIN   3,457,945
AGRICULTURAL IRRIGATION
Filed Aug. 16, 1966   3 Sheets-Sheet 2
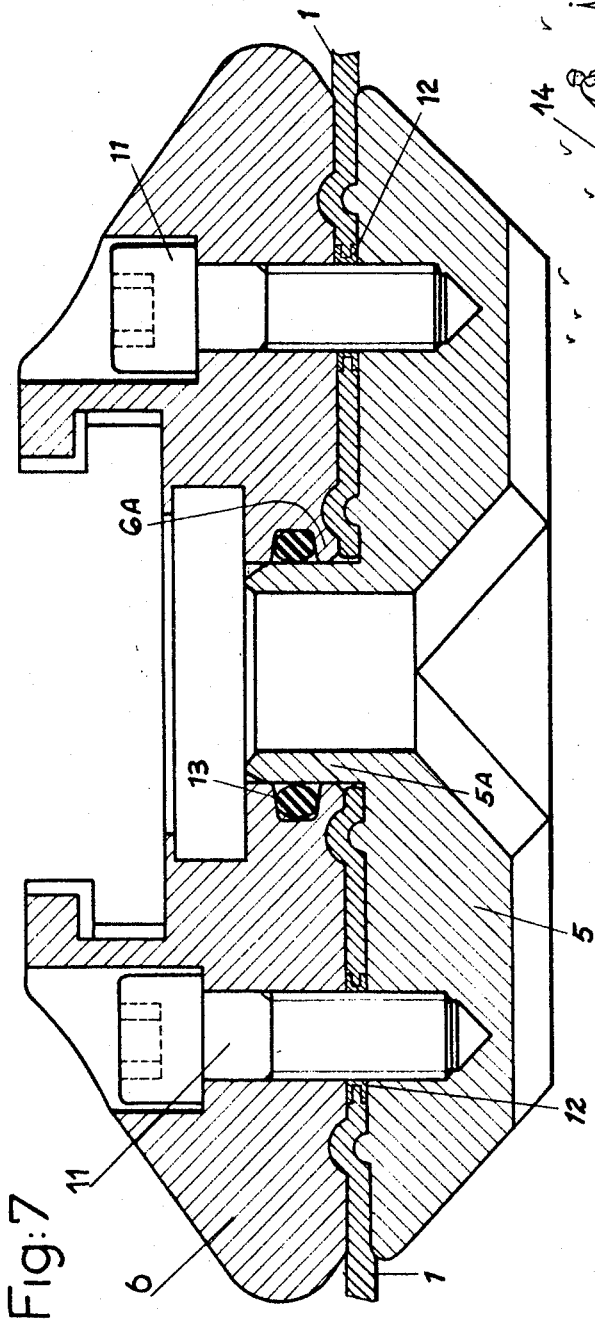
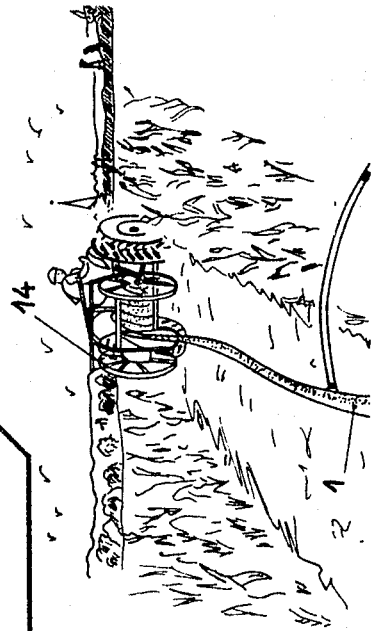

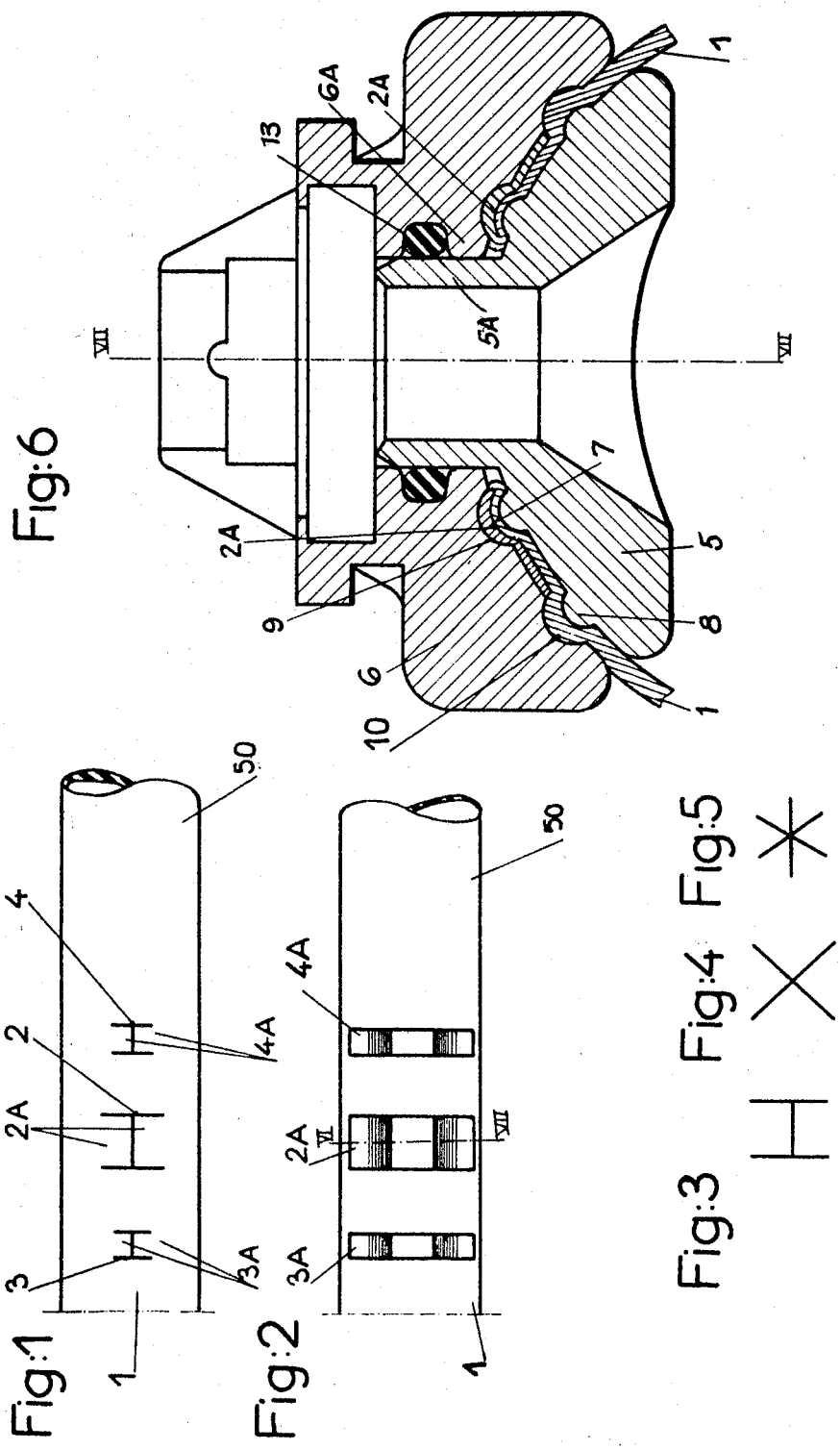

Fig: 9
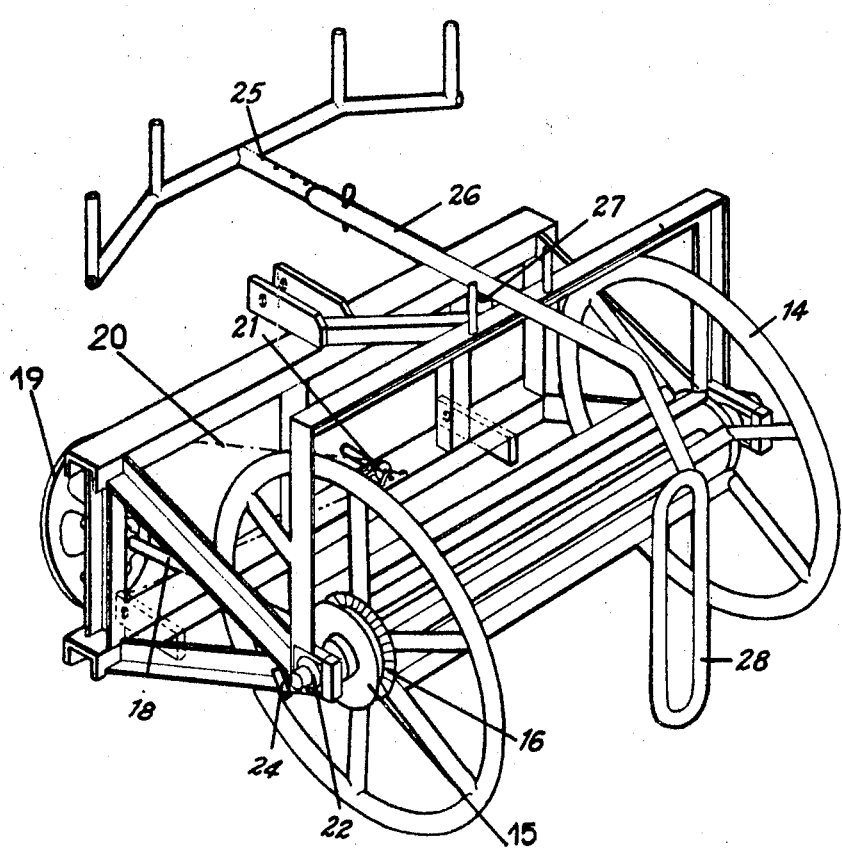
Fig: 10
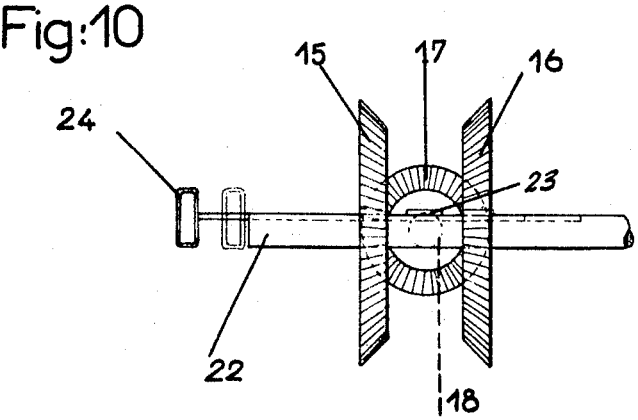

United States Patent Office 3,457,945
Patented July 29, 1969

3,457,945
AGRICULTURAL IRRIGATION
Michel Leon Jean Martin, Saint-Cloud, France, assignor to Eau et Feu, Societe Anonyme, Saint-Cloud, Hauts-de-Seine, France, a company of France
Filed Aug. 16, 1966, Ser. No. 572,751
Claims priority, application France, Aug. 20, 1965, 28,985; Sept. 3, 1965, 30,369; July 8, 1966, 68,742
Int. Cl. F16l 25/00, 11/04
U.S. Cl. 137—355.16                     9 Claims

ABSTRACT OF THE DISCLOSURE

This invention is concerned with a flexible hosepipe consisting basically of a tubular fabric of woven textile material for agricultural irrigation which is flat wound on a reel mounted on a vehicle when not under pressure and provided at regular intervals along it with side connectors for the connection of pipes of smaller diameter at right angle to it, wherein the openings made in said hosepipe for the insertion of the connectors are formed by at least two crossing slots defining tongues between them which are turned over on themselves to form the opening and wherein the connectors fitted over the openings in the hosepipe comprise an inner and an outer member between which the edges of the openings formed by the returned tongues are gripped by means of corresponding recesses and projections squeezing said edge between them.

---

This invention relates to agricultural irrigation.

In flexible-hose irrigation, as at present advocated, a reel is provided, on which a flexible hose, known as a "secondary pipe," is wound when not under pressure, the reel being mounted on a vehicle. This hose, which is connected in turn to points in a primary feed pipe, generally fixed, is laid and recovered at regular intervals. The secondary pipe has side connectors for the connection of small pipes known as "tertiary" pipes, which extend at right angles to the secondary pipe. These pipes are provided with sprinkler heads, so that large areas can be watered, the number of persons employed being reduced and operation facilitated.

To bring this technique within the range of all users, however, it is desirable to reduce the cost of the equipment and pipes, while maintaining the strength and hard-wearing qualities of the latter, despite the holes left in them for the tertiary pipe connections.

This invention provides that the holes made in the secondary hosepipe at the points where the connectors in question are fitted are derived from slots of H, Y or similar shapes, the tongues of these slots being turned over on themselves before being gripped between the inner and the outer members of the connectors.

The invention also includes the following improvements in the side connections between the tertiary pipes and the secondary pipes:

The perforations are carried out hot when the warp and weft threads are of nylon or the like.

An adhesive or solvent may be applied around the slots before the tongues are turned over.

The perforations may be made with the aid of heated punches.

The two members of each connector, by which the inner and outer faces of the pipes are gripped around the perforation, incorporate recesses and corresponding projections extending in continuous lines around at least the passage through which the liquid flows.

The inner member of the connector has an annular projection, which fits into a corresponding recess in the outer member of the connector, a packing ring being interposed.

The two members of the connector are held in place by screws.

The holes made in the pipe to take the screws can be made in the same way as those serving for the connection of the tertiary pipes, or they may be formed with tubular rivets.

The inner and outer members of the connector may be fixed directly to the pipe by the use of an adhesive or by vulcanisation.

The reel on which the hosepipe is wound when not under pressure rotates in a frame designed for temporary mounting on a tractor and can be driven from the same power source as the tractor by means of a chain-and-sprocket or belt-and-pulley transmission or any other means serving the same purpose.

The hose-reel driving spindle carries two opposed bevel gear-wheels in mesh with a driving bevel wheel, means such as a sliding key being provided, whereby one or other of the opposed bevel wheels can be locked against rotation on the spindle or both of them can be allowed to rotate freely thereon.

A reeling guide, consisting of a lever articulated to the reel support and carrying an eye through which the hose passes can be moved across the reel from the driver's seat with the aid of an operating handle fixed to the end of the lever.

Alternating angular motion is imparted automatically to the reeling guide by a kinematic linkage from one of the members by which motion is transmitted to the reel.

In the accompanying drawings, given by way of example, only:

FIGURE 1 is a side view of a hosepipe provided with H-shaped slots in accordance with the invention, for the attachment of a connector;

FIGURE 2 is a similar view, the tongues of the slots here having been turned over;

FIGURES 3, 4 and 5 show slots of various shapes;

FIGURE 6 is an enlarged cross-section along the line VI—VI in FIGURE 2 and shows the hose with its connector fitted in position;

FIGURE 7 is a cross-section along the line VII—VII in FIGURE 6;

FIGURE 8 shows a tractor fitted with a hose-reel;

FIGURE 9 is a perspective drawing of the hose-reel equipped for reversing or disconnecting the reel drive; and FIGURE 10 is a side elevation showing this reversing and disconnecting device in greater detail.

In order not to weaken hoses 1 at the points where the halves of the connectors are fixed to them, the perforations made in hoses 1 may be H-shaped, for example, as shown at 2, 3 and 4 in FIGURE 1. Various possible shapes for the slots are illustrated by way of example in FIGURES 3, 4 and 5. The tongues thus formed, 2A, 3A and 4A, are then turned over on themselves, as shown in FIGURE 2, before inner member 5 and outer member 6 of the connector half are fitted as shown more particularly in FIGURES 6 and 7.

Before members 5 and 6 are assembled, the precaution is taken of applying an adhesive or solvent to at least the edges of the H-shaped slots, according to the nature of the reinforcing threads in the hosepipe. Once the two members 5 and 6 have been locked in position, the weft threads cut at the slots can no longer slip when the hosepipe is under pressure, so that the same bursting characteristics are obtained as if the pipe were unpierced.

Projections 7 and 8 and the corresponding recesses, 9 and 10, in members 5 and 6, further improve the anchorage and present themselves, in plan, in the form of continuous lines round the central opening. The slots may be shaped like an X or an asterisk, as shown in FIGURES 4 and 5, in which case the tongues can be turned over transversely and longitudinally, thus locking the cut ends of both the warp and the weft threads. To enable screws 11, by which members 5 and 6 are held together, to pass through, slots of H or similar shape may be provided, as illustrated at 3 and 4 in FIGURES 1 and 2. Alternatively, these perforations needing to have only a small diameter, tubular eyelets 12 may be fitted if necessary, with the aid of a punch, without cutting the warp and weft threads.

It will be observed that member 5 incorporates a central tubular portion, 5A, which fits into a corresponding socket portion, 6A, in member 6, a packing ring being provided at 13 to provide a good seal.

FIGURES 9 and 10 show improvements to the reeling equipment, reel 14 of which can be disconnected from the drive or driven in either direction. For this purpose, a pair of opposing bevel wheels, 15 and 16, are provided, continuously in mesh with driving bevel wheel 17. Wheel 17 is keyed to spindle 18, which carries a sprocket wheel, 19, engaged with a chain, 20, fitted on small sprocket 21, which takes its drive from a power pick-up on the tractor that carries the reeling equipment.

Bevel wheels 15 and 16 can be locked angularly, separately but not simultaneously, to spindle 22 of reel 14 by means of a key, 23, which can be moved to and fro by handle 24. In the position shown in FIGURE 10, key 23 lies between wheel 15 and 16, which are thus free to turn on spindle 22 without imparting rotary motion to it. Handle 24 could be worked by Bowden cable from the driver's seat, with aid of a control lever articulated to T-shaped arm 25. This arm serves to control the direction of lever 26, which is articulated at 27 and carries a hose reeling guide in the form of an eye, 28, through which the hose passes. T-shaped arm 25 is mounted telescopically in lever 26, for adjustment to the length desired.

What we claim is:

1. A flexible hosepipe for agricultural irrigation comprising a tubing of woven textile material, which can be wound flat, when not under pressure, on a reel mounted on a vehicle, openings made in that hosepipe at regular intervals along it for the connection of pipes of smaller diameter, said openings formed by at least two intersecting slots defining tongues which are turned over flat on themselves to form a reinforced edge, connectors mounted over said openings and comprising an inner member and an outer member provided with corresponding recesses and projections respectively surrounding said opening and gripping said reinforced edge thereof.

2. A device as defined in claim 1, in which the openings in the pipe consist of three slots arranged to form a letter H.

3. A device as defined in claim 1, in which the openings consist of at least two slots crossed to form a letter X.

4. A device as defined in claim 1, in which the edges of the slots are coated with an adhesive or treated with a solvent in the case of pipes which incorporate reinforcement woven from synthetic filaments.

5. A device as defined in claim 1, in which, in the case of a flexible pipe incorporating a flexible reinforcement made from filaments of thermoplastic material, the slots are produced under heat and, more particularly, by hot punching.

6. A device as defined in claim 1, in which the inner member of the connector has a central tubular portion, a corresponding housing provided in the outer member of the connector into which said central portion of the inner member is fitted, a packing ring being interposed to form a seal between said tubular member and said housing.

7. A device as defined in claim 6, in which the two members of the connector are assembled and held together by screws, openings arranged in the pipe for said screws, these openings being formed by slots, like the openings in which the connectors are fitted, and provided with annular eyelets.

8. A device as defined in claim 7, in which the members of the connector are fixed to the pipe by means of an adhesive.

9. A device according to claim 8, in which the members of the connector are fixed to the pipe by vulcanisation.

References Cited

UNITED STATES PATENTS

| | | | |
|---|---|---|---|
| 969,598 | 9/1910 | Buttles | 242—158.1 XR |
| 972,222 | 10/1910 | Paul | 242—86.2 |
| 1,851,758 | 3/1932 | Eger | 285—200 XR |
| 2,148,419 | 2/1939 | Parker | 285—200 XR |
| 2,518,990 | 8/1950 | Keener | 242—86.2 XR |
| 2,570,573 | 10/1951 | Liboiron | 242—86.2 XR |
| 2,746,774 | 5/1956 | Nielsen | 285—200 |
| 3,150,830 | 9/1964 | Griffith | 137—355.16 XR |
| 3,195,932 | 7/1965 | Morton | 285—200 |
| 3,221,920 | 12/1965 | Buys | 285—202 XR |
| 3,346,213 | 10/1967 | Nelson | 242—86.2 |

FOREIGN PATENTS

| | | |
|---|---|---|
| 104,979 | 10/1964 | Norway. |
| 122,838 | 11/1946 | Australia. |

SAMUEL SCOTT, Primary Examiner

U.S. Cl. X.R.

285—200, 204